United States Patent [19]
Gau et al.

[11] Patent Number: 5,533,483
[45] Date of Patent: Jul. 9, 1996

[54] ENGINE AIR INTAKE SYSTEM HAVING A BYPASS CURRENT CONTROL VALVE

[75] Inventors: Tien-Ho Gau; Yu-Yin Peng, both of Hsinchu, Taiwan

[73] Assignee: Industrial Technology Research Institute, Hsinchu, Taiwan

[21] Appl. No.: 434,916

[22] Filed: May 4, 1995

[51] Int. Cl.$^6$ .................................................. F02B 15/00
[52] U.S. Cl. .................................................. 123/308
[58] Field of Search ........................ 123/306, 308, 123/585, 586, 432, 590

[56] References Cited

U.S. PATENT DOCUMENTS

| | | | |
|---|---|---|---|
| 4,186,706 | 2/1980 | Matsumoto | 123/306 |
| 4,347,816 | 9/1982 | Saito et al. | 123/308 |
| 4,445,473 | 5/1984 | Matsumoto | 123/308 |
| 4,445,480 | 5/1984 | Inoue et al. | 123/308 |
| 4,481,922 | 11/1984 | Sugiura | 123/306 |
| 5,255,648 | 10/1993 | Hokazono et al. | 123/308 |
| 5,325,828 | 7/1994 | Yamaguchi et al. | 123/308 |

FOREIGN PATENT DOCUMENTS 0288324  12/1987  Japan ............................. 123/306

*Primary Examiner*—Marguerite McMahon
*Attorney, Agent, or Firm*—Browdy and Neimark

[57] ABSTRACT

An engine air intake system comprises a main air duct and at least one bypass air duct, which are located side by side. The bypass air duct is smaller in cross-sectional area than the main air duct which is provided with a throttle contiguous to the bypass air duct having therein a control valve. The throttle and the control valve are regulated by a link mechanism such that the throttle is closed when the engine is operating at a low or intermediate load rate, and that the control valve is opened partially when the throttle remains closed, thereby resulting in an acceleration of air current flowing through the bypass air duct and an improvement in the tumble or swirl ratio. As the engine is operating at a progressively increasing load rate, the throttle is caused to open gradually to bring about an increase in the engine air intake volume so as to enable the engine to operate under the optimum condition.

5 Claims, 3 Drawing Sheets

(A)            (B)

ENGINE AIR INTAKE SYSTEM HAVING A BYPASS CURRENT CONTROL VALVE

FIELD OF THE INVENTION

The present invention relates generally to an engine mechanism, and more particularly to an engine air intake system having a bypass current control valve.

BACKGROUND OF THE INVENTION

With a view to improving the fuel efficiency of a four-stroke engine and to lowering the air pollutants produced by the four-stroke engine, various improvements on the air-fuel ratio of the four-stroke engine have been made in the past. However, according to a number of tests, the current speed at which the engine air intake takes place is also an important factor affecting the fuel efficiency of the engine. It is known that the acceleration of the current of the engine air intake can bring about a strong turbulence in the engine cylinder, thereby resulting in an increase in the tumble ratio or the swirl ratio. As a result, the combustion variability of the engine is so reduced as to enhance the combustion efficiency of the engine.

The conventional method of improving the energy efficiency of a four-stroke engine includes an air duct which is located at the vicinity of the air intake valve and along the direction in which the valve stem is located. Such a design as described above can maximize the opening of the fuel gate, the quantity of air intake and the acceleration of the air current at such time when the work is done by the engine at a high load, thereby resulting in an output of greatest horsepower, as illustrated in FIG. 1A. However, when the engine is operating at an intermediate or low load, the amount of air intake and the speed at which the air current flows through the intake valve are reduced to an extent that the air current becomes stagnant in the engine cylinder, as shown in FIG. 1B, and that air and fuel are not mixed in an optimum ratio, and further that the fuel combustion is so undermined as to produce a large amount of exhaust fume hazardous to human heath.

SUMMARY OF THE INVENTION

It is therefore the primary objective of the present invention to provide an engine air intake system with a bypass current control valve for improving the fuel combustion and reducing the exhaust fume. The air intake system comprises a main air duct and a bypass air duct, which are located side by side and provided respectively with a main air duct valve and a bypass air duct valve. When the engine is operating at a load rate, the main air duct valve and the bypass air duct valve cooperate with each other to bring about an acceleration of the incoming air current and an improvement in the tumble or swirl ratio, thereby maximizing the engine combustion and minimizing the discharge of exhaust fume.

It is another objective of the present invention to provide an engine air intake system which is relatively simple in construction and is therefore cost-effective.

In keeping with the principle of the present invention, the foregoing objectives of the present invention are attained by an engine air intake system comprising a main air duct and a bypass air duct, which are located side by side. The bypass air duct is smaller in cross-sectional area than the main air duct. The main air duct is provided with a throttle contiguous to the bypass air duct which is provided with a control valve. The throttle and the control valve are regulated by a link mechanism of the air intake system such that the throttle of the main air duct is closed when the engine is operating at an intermediate or low load rate and that the control valve of the bypass air duct is opened partially when the throttle of the main air duct remains closed, thereby resulting in an acceleration of air current flowing through the bypass air duct and an improvement in the tumble or swirl ratio. As the engine is caused to operate under a progressively increasing load, the throttle of the main air duct is caused to open gradually to bring about an increase in volume of the engine air intake so as to enable the engine to operate under the optimum condition.

The foregoing objectives, structures, functions, features and advantages of the present invention will be more readily understood upon a thoughtful deliberation of the following detailed description of the present invention in conjunction with the accompanying drawings.

DETAILED DESCRIPTION OF THE INVENTION

Figure 1:
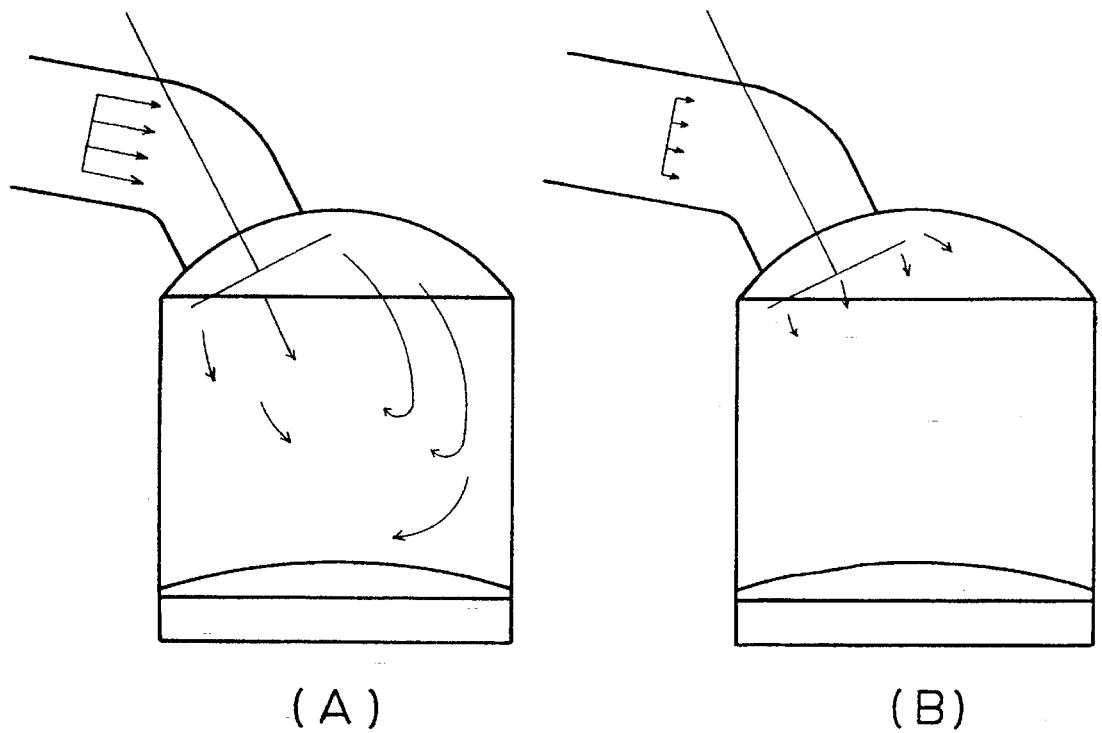
FIGS. 1A and 1B include two schematic views illustrating a prior art engine air intake system at work.
Figure 2:
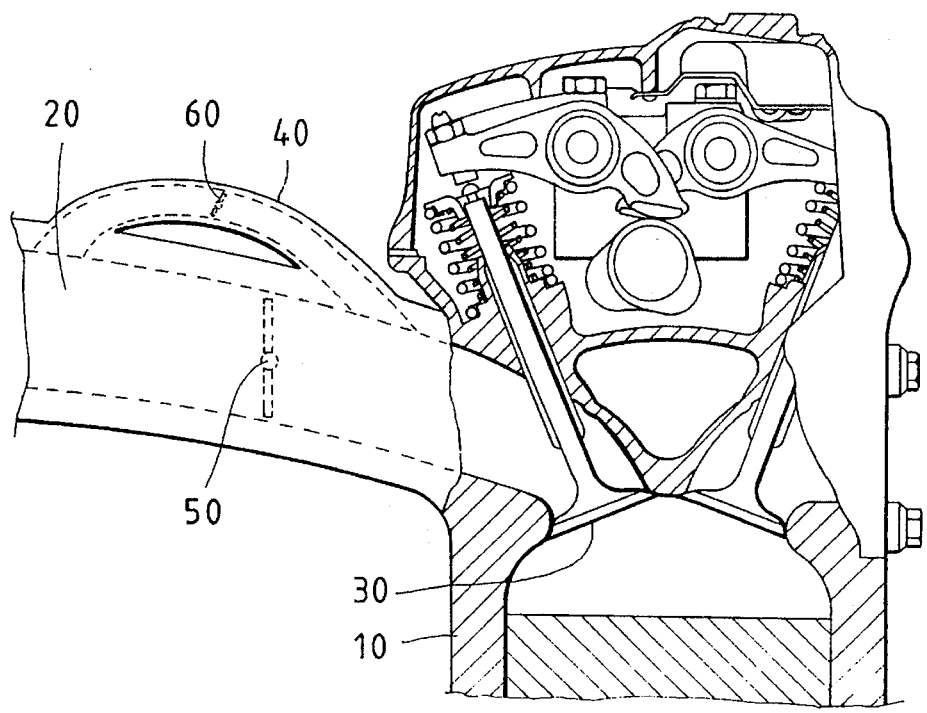
FIG. 2 shows a side schematic view of a first preferred embodiment of the present invention in conjunction with an engine having one cylinder and one air intake.
Figure 3:
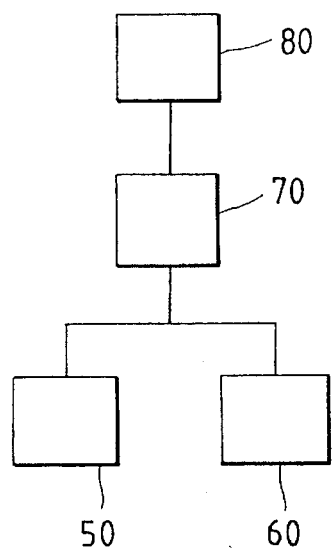
FIG. 3 shows a block diagram of the present invention at work.

As shown in FIG. 2, a four-stroke engine cylinder 10 has a head which is provided with a main air duct 20 for air intake and an air intake valve 30 located at the inner end of the main air duct 20. The main air duct 20 is furnished with a bypass air duct 40 having a cross-sectional area smaller than that of the main air duct 20. The main air duct 20 is further furnished therein with a throttle 50 contiguous to the bypass air duct 40 which is provided therein with a control valve 60. The throttle 50 and the control valve 60 are in communication with an accelerator 80 by means of a link mechanism 70, as illustrated in FIG. 3. The link mechanism 70 is actuated by the accelerator 80 so as to regulate the opening of the throttle 50 and the control valve 60. The link mechanism 70 may be similar in construction to a connection mechanism or an electromagnetic valve.

The required amount of air intake of an engine is relatively smaller when the engine is operated at a relatively low load rate. As a result, the throttle 50 of the main air duct 20 is driven by the accelerator 80 via the link mechanism 70 to remain closed. In the meantime, the control valve 60 of the bypass air duct 40 is opened appropriately to allow air current to flow therethrough at a faster rate in view of the fact that the bypass air duct 40 has a relatively small cross-sectional area. The tests show that a greater turbulence is brought about in the cylinder 10 when the distance between the air intake valve 30 and the inner end of the bypass air duct 40 is shorter. As the engine is operated at a progressively heavy load, the control valve 60 of the bypass air duct 40 is driven by the link mechanism 70 so as to remain opened in full. In the meantime, the throttle 50 of the main air duct 20 is opened up gradually. Both the throttle 50 of the main air duct 20 and the control valve 60 of the bypass air duct 40 are opened in full to allow the entry of an optimum amount of air into the engine which is operating at a full load. In other words, when the throttle 50 of the main air duct 20 and the control valve 60 of the bypass air duct 40 are opened up in full, the tumble or swirl ratio is increased to an extent that the combustion variability of the engine is minimized, and that an optimum air-fuel ratio is attained, and further that the combustion efficiency is so improved as to reduce the fuel consumption and the discharge of harmful exhaust fume.

Figure 4:
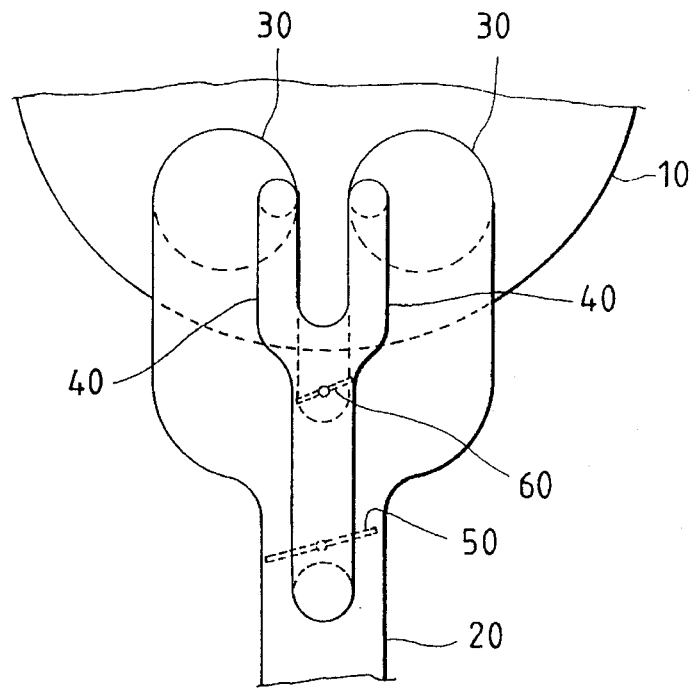
FIG. 4 shows a top schematic view of a second preferred embodiment of the present invention in conjunction with an engine having one cylinder and two air intakes.
Figure 5:
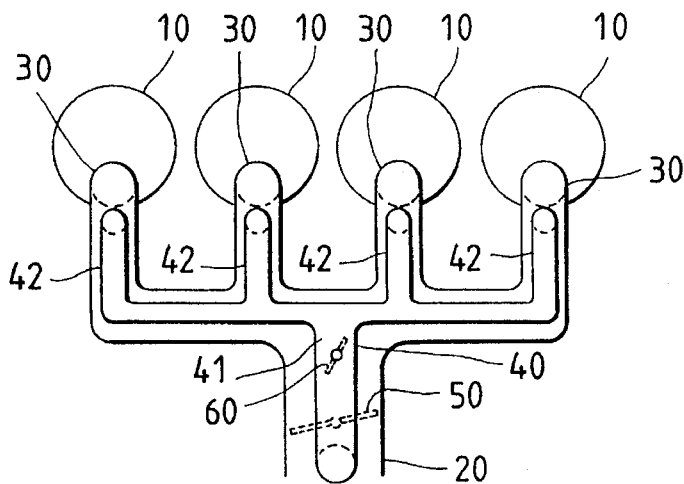
FIG. 5 is a top schematic view showing that a third preferred embodiment of the present invention is applied to an engine having a plurality of cylinders, one air intake, and a plurality of bypass air ducts which are provided commonly with a control valve.
Figure 6:
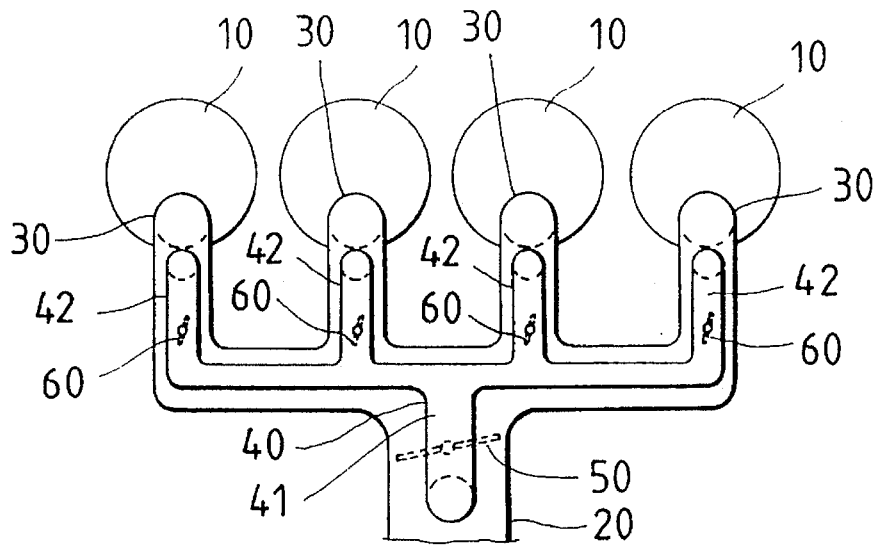
FIG. 6 is a top schematic view showing that the third preferred embodiment of the present invention is applied to an engine having a plurality of cylinders, one air intake, and a plurality of bypass air ducts which are provided respectively with a control valve.
Figure 7:
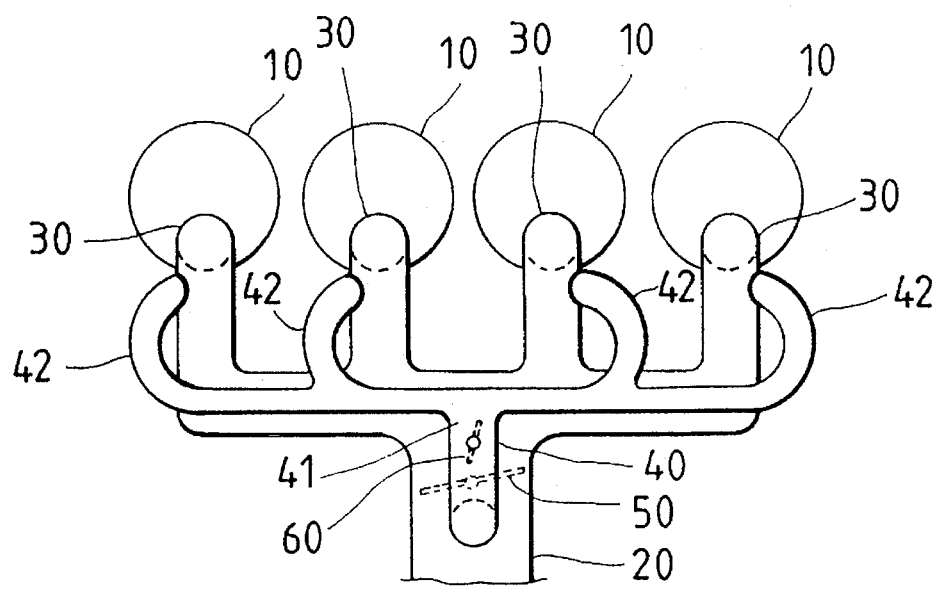
FIG. 7 is a top schematic view showing that the third preferred embodiment of the present invention is applied to an engine having a plurality of cylinders, one air intake, and a plurality of bypass air ducts which are arranged sideways.

As shown in FIG. 4, the second preferred embodiment of the present invention is applied to an engine having one cylinder 10 which is provided with two air intake valves 30. The main air duct 20 is peripherally branched out to form two bypass air ducts 40 extending to reach the vicinity of the air intake valves 30. Now referring to FIG. 5, the third preferred embodiment of the present invention is put to work in conjunction with an engine having four cylinders 10, one main air duct 20, and four air intake valves 30. The main air duct 20 is peripherally branched out to form a bypass air duct 40 having one primary branch 41 which is further branched out to form four secondary branches 42 extending to reach the proximity of the air intake valves 30. The primary branch 41 of the bypass air duct 40 is provided therein with a control valve 60. In addition, the secondary branches 42 of the bypass air duct 40 are provided therein respectively with a control valve 60, as shown in FIG. 6. Furthermore, the branches of the bypass air duct 40 of the third preferred embodiment of the present invention are arranged in a circular manner so that various forms of turbulence can be brought about. It is therefore readily apparent that the bypass air duct 40 of the present invention may be branched out in various forms in accordance with the number of the cylinder 10 and the number of the air intake valves 30 of the engine, so as to minimize the combustion variability of the engine by accelerating the air current flowing into the engine operating at various load rates. As a result, the present invention is capable of providing an engine with an optimum air-fuel mixture to ensure that the combustion efficiency is so improved as to reduce the fuel consumption of the engine and the exhaust fume discharged by the engine.

The embodiments of the present invention described above are to be regarded in all respects as merely illustrative and not restrictive. Accordingly, the present invention may be embodied in other specific forms without deviating from the spirit thereof. The present invention is therefore to be limited only by the scope of the following appended claims.

What is claimed is:

1. An air-fuel mixture intake system of a cylinder of a four-stroke engine comprising a main air-fuel mixture duct which is located adjacent an air-fuel mixture intake valve of a combustion chamber of said cylinder and is provided with at least one bypass air-fuel mixture duct having a cross-sectional area smaller than a cross-sectional area of said main air-fuel mixture duct, said bypass duct having an inner end including an orifice in a wall of said main duct adjacent said air-fuel mixture intake valve, said inner end being angularly disposed to said main air-fuel duct to direct a flow of said air-fuel mixture toward said air-fuel mixture intake valve seat, said bypass air-fuel mixture duct provided therein with a control valve, said main air-fuel mixture duct provided therein with a throttle contiguous to said bypass air-fuel mixture duct, said throttle and said control valve being regulated by first accelerator linking device means for closing said throttle when said engine is operated at a lower load rate, and for opening said bypass air-fuel mixture duct when said throttle of said main air-fuel mixture duct is caused to close, so as to permit air-fuel mixture to flow through said bypass air-fuel mixture duct at an accelerating pace to bring about a strong turbulence in said combustion chamber to promote efficient and rapid combustion, and second accelerator linking device means for gradually opening said throttle of said main air-fuel mixture duct when said engine is operated at a load rate greater than said lower load rate so as to bring about an increase in air-fuel mixture intake volume of said engine.

2. The air-fuel mixture intake system of a cylinder according to claim 1, wherein said main air-fuel mixture duct is provided with a plurality of bypass air-fuel mixture ducts arranged upwardly and circularly.

3. The air-fuel mixture intake system of a cylinder according to claim 1, wherein said main air-fuel mixture duct is provided with a plurality of bypass air-fuel mixture ducts arranged sideways and circularly.

4. The air-fuel mixture intake system of a cylinder according to claim 2, wherein said bypass air-fuel mixture ducts are provided therein respectively with a control valve.

5. The air-fuel mixture intake system of a cylinder according to claim 3, wherein said bypass air-fuel mixture ducts are provided therein respectively with a control valve.

* * * * *